US009553471B2

United States Patent
Chinnadurai et al.

(10) Patent No.: US 9,553,471 B2
(45) Date of Patent: Jan. 24, 2017

(54) METHOD AND SYSTEM FOR WIRELESSLY CHARGE A DIAGNOSTIC TOOL

(71) Applicant: Service Solutions U.S. LLC, Warren, MI (US)

(72) Inventors: Manokar Chinnadurai, Owatonna, MN (US); Reed Selkirk, Kalamazoo, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 649 days.

(21) Appl. No.: 13/835,082

(22) Filed: Mar. 15, 2013

(65) Prior Publication Data

US 2014/0266024 A1 Sep. 18, 2014

(51) Int. Cl.
*H02J 7/00* (2006.01)
*G01N 27/416* (2006.01)
*B60R 25/10* (2013.01)
*B60Q 1/00* (2006.01)
*H02J 7/02* (2016.01)
*B25H 3/00* (2006.01)

(52) U.S. Cl.
CPC ............... *H02J 7/025* (2013.01); *B25H 3/00* (2013.01)

(58) Field of Classification Search
CPC ........ H02J 7/025; H02J 7/0004; H02J 7/0006; H02J 7/0045; H02J 7/0042; H02J 7/0044; H01F 38/14; B60L 11/182; Y02E 60/12; Y02T 90/122; H01M 10/48; H01M 10/4257; H01M 2/1055; H01M 10/46; H01M 10/425; H01M 2/1022; G01R 31/3627; G01R 31/3648; G01R 31/3662; G01R 31/3631; B60R 1/12; B60R 1/00; B60R 2001/1215; B60R 25/1004; B60R 25/1003; B60R 25/1001; B60R 25/1018; B60R 25/04; B60R 21/015; B60Q 1/525; B60Q 9/00; B60K 35/00; B60K 37/02; G07C 5/008

USPC 320/108, 106, 112, 113, 114, 115; 324/426; 340/425.5, 428, 438

See application file for complete search history.

(56) References Cited

U.S. PATENT DOCUMENTS

| | | | | |
|---|---|---|---|---|
| 8,805,456 | B1* | 8/2014 | Hardy | H02J 7/025 455/41.1 |
| 8,880,274 | B2* | 11/2014 | Chenn | G07C 5/008 701/2 |
| 2006/0273764 | A1* | 12/2006 | Huang | H02J 7/0004 320/151 |
| 2009/0206674 | A1 | 8/2009 | Noguchi et al. | |
| 2009/0212737 | A1* | 8/2009 | Johnson | A47B 96/02 320/108 |
| 2010/0007307 | A1* | 1/2010 | Baarman et al. | 320/108 |
| 2010/0201201 | A1* | 8/2010 | Mobarhan | H02J 5/005 307/104 |
| 2012/0140963 | A1 | 6/2012 | Larsen et al. | |
| 2012/0164943 | A1* | 6/2012 | Bennett | G06Q 20/3674 455/41.1 |

(Continued)

OTHER PUBLICATIONS

International Preliminary Report on Patentability dated Sep. 24, 2015 in International Application PCT/US2014/028143.

*Primary Examiner* — Richard Isla Rodas
*Assistant Examiner* — Mohammed J Sharief
(74) *Attorney, Agent, or Firm* — Baker Hostetler LLP (57) ABSTRACT

An electrical charging system including a storing vessel for storing a diagnostic tool and a wireless charging system integrated with the storing vessel for wirelessly charging the diagnostic tool when the diagnostic tool is placed within the storing vessel.

18 Claims, 7 Drawing Sheets

(56) References Cited

U.S. PATENT DOCUMENTS

| | | | |
|---|---|---|---|
| 2013/0109375 A1* | 5/2013 | Zeiler | H04W 12/12 455/426.1 |
| 2013/0175993 A1* | 7/2013 | Chen | 320/114 |
| 2014/0103858 A1* | 4/2014 | Bertsch | H02J 7/0054 320/103 |

\* cited by examiner

METHOD AND SYSTEM FOR WIRELESSLY CHARGE A DIAGNOSTIC TOOL

FIELD OF THE DISCLOSURE

The present disclosure relates generally to a method and system for charging a battery. More particularly, the present disclosure relates to a method and system for wirelessly charging a battery of a diagnostic tool.

BACKGROUND OF THE DISCLOSURE

In many industries, diagnostic systems play an increasingly important role in manufacturing processes, as well as in maintenance and repair throughout the lifetime of the equipment or product. Some diagnostic systems are based on personal computer technology and feature user-friendly, menu-driven diagnostic applications. These systems assist technicians and professionals at all levels in performing system diagnostics.

With equipment and products becoming more advanced, more complex, and more expensive with the addition of electronic components the knowledge base and financial resources required to properly use, maintain, and fix these items have grown immensely. Different diagnostic systems are built with varying capabilities to perform various functions. For example, some diagnostic systems may include a simple code reader, while other diagnostic systems include complex computer architectures. Oftentimes, diagnostic systems are powered by portable power source for standalone operation with wireless connection to the equipment's interface. The portable power source typically requires a wall adapter or a charger device with a physical connection to an electrical power source. Also, the portable power source may require a long time to charge and thus render the diagnostic systems inoperable during charging.

Accordingly, it is desirable to provide a method and system that efficiently charges a portable power source of a diagnostic system. Also, it is desirable to provide a method and system that wirelessly charge the portable power source of a diagnostic system.

SUMMARY OF THE INVENTION

The foregoing needs are met, to a great extent, by the present invention, wherein in one aspect an apparatus is provided that in some embodiments include a wireless charging system integrated with a storing vessel for charging a diagnostic tool.

In accordance with one embodiment of the present disclosure, an electrical charging system may include a storing vessel for storing a diagnostic tool and a wireless charging system integrated with the storing vessel for wirelessly charging the diagnostic tool when the diagnostic tool is placed within the storing vessel.

In accordance with another embodiment of the present disclosure, a wireless charging system may include a communication module that comprises a transceiver and communicates with a diagnostic tool. The wireless charging system may also include a power module that comprises a computer processor for receiving power signals from a power source and an output module that comprises a power circuitry for outputting a power signal to wirelessly charge the diagnostic tool.

In accordance with yet another embodiment of the present disclosure, a wireless charging system may include a communication module that comprises a transceiver for receiving information from a diagnostic tool, wherein the information from the diagnostic tool comprises information of the diagnostic tool and diagnostic information stored by the diagnostic tool. The wireless charging system may also include a power module that comprises a computer processor for receiving power signals from a power source and an output module that comprises a power circuitry for outputting a power signal to wirelessly charge the diagnostic tool based at least in part on the information of the diagnostic tool.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment in accordance with the present invention provides a charging system that may wirelessly charge a portable power source of a diagnostic tool. The charging system may include a wireless power transmitter having a shape that conforms to a diagnostic tool. For example, the wireless power transmitter may be integrally incorporated in a container carrying the diagnostic tool. In another example, the wireless power transmitter may be integrally incorporated in a storage cabinet storing the diagnostic tool. In other examples, the wireless power transmitter may be integrally incorporated in a tool box storing the diagnostic tool.

Figure 1:
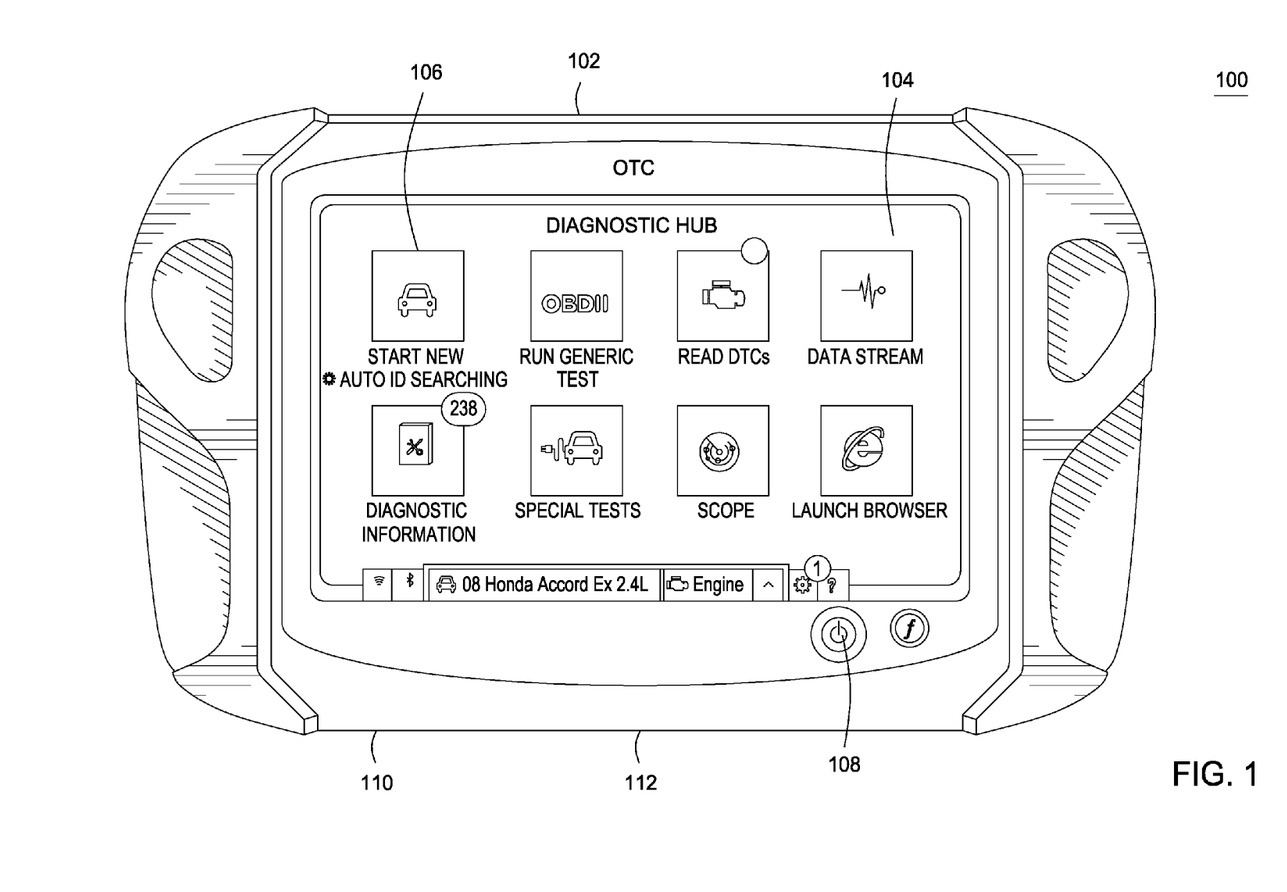
FIG. 1 depicts a front view of a diagnostic tool according to an exemplary embodiment of the present disclosure.

An embodiment of the present inventive system is illustrated in FIG. 1. In particular, FIG. 1 is a front view illustrating a diagnostic tool 100 according to an embodiment of the invention. The diagnostic tool 100 may be any computing device, including a computer, a personal computer, a laptop, a cellular communication device, a workstation, a mobile device, a smart phone, a television, a tablet, a personal digital assistant (PDA), a thin system, a fat system, a network appliance, a gaming console, a wearable mounted device, an Internet computing device, a global positioning system (GPS), a range finder, or other any other computing device. In some embodiments, the diagnostic tools 100 may be power tool, security systems, or the like. The power tool may include, drills, saws, impact drivers, compressors, grinder, sander, joiner, cutter, wrench, hammer, blower, rotary tools, pneumatic tools, measuring tools, fluid electronic timers, routers, oscillating tools, cleaner and the like. The diagnostic tool 100 may include software in order to diagnose problems of the equipment under test. In another example, the diagnostic tool 100 may be, the Genisys® Touch diagnostic tool from Service Solutions (a unit of Robert Bosch GmbH) in Owatonna, Minn. or Elite Autoscanner® Pro CP9190 from Actron (a unit of Service Solutions).

The diagnostic tool 100 may include a housing 102 to house the various components of the diagnostic tool 100, such as a display 104, a user interface 106, a power key 108, a memory card reader 110 (optional) and a connector interface 112. The display 104 can be any display, for example, a liquid crystal display (LCD), light emitting diode (LED), organic light emitting diode (OLED), a video graphics array (VGA), a touch display (which can also be a user interface), etc. The user interface 106 may allow the user to interact with the diagnostic tool 100 in order to operate the diagnostic tool 100 as desired. The user interface 106 may include touch screen icons, function keys, arrow keys or any other type of keys that may manipulate the diagnostic tool 100 in order to operate various menus that may be presented on the display 104. The user interface 106 may also include a mouse or any other suitable input device, including a keypad, or a scanner. The user interface 106 can also include numbers or alphanumeric. The power key 108 may allow the user to turn the diagnostic tool 100 on and off, as required.

Memory card reader 110 may be a single type card reader for a memory card, such as a compact flash card, floppy disc, memory stick, secure digital memory, flash memory or other types of memory. The memory card reader 110 may be a reader that reads more than one of the aforementioned memory such as a combination memory card reader. Additionally, the memory card reader 110 may also read any other computer readable medium, such as CD, DVD, UMD, etc.

The connector interface 112 may allow the diagnostic tool 100 to connect to an external device, such as an ECU of a vehicle (via a data link connector), a sensor, a computing device, an external communication device (such as a modem), a network, etc. through a wired or wireless connection. Connector interface 112 may also include a USB, FIREWIRE, modem, RS232, RS485, and other connections to communicate with external devices, such as a hard drive, USB drive, CD player, DVD player, UMD player or other computer readable medium devices.

Figure 2:
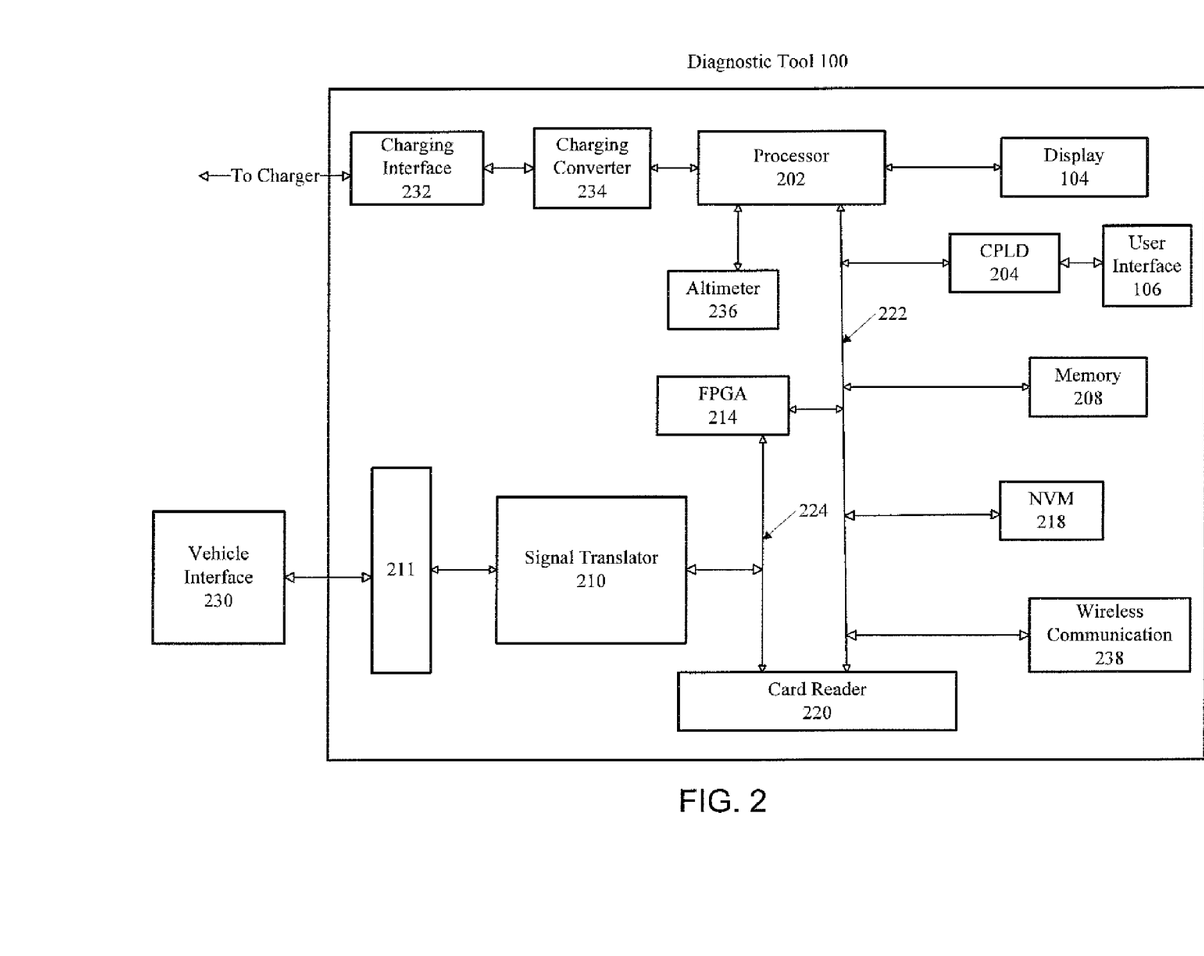
FIG. 2 depicts components of a diagnostic tool according to an exemplary embodiment of the present disclosure.

FIG. 2 is a block diagram of the components of the diagnostic tool 100 according to an embodiment of the present disclosure. In FIG. 2, the diagnostic tool 100 according to an embodiment of the present disclosure may include a processor 202, a field programmable gate array (FPGA) 214, a first system bus 224, the display 104, a complex programmable logic device (CPLD) 204, the user interface 106, a memory subsystem 208, an internal non-volatile memory (NVM) 218, a card reader 220, a second system bus 222, a connector interface 211, a selectable signal translator 210, a charging interface 232, a charging converter 234, an optional altimeter 236 and wireless communication circuit 238. A vehicle communication interface 230 is in communication with the diagnostic tool 100 through connector interface 211 via an external cable (not shown).

Selectable signal translator 210 may communicate with the vehicle communication interface 230 through the connector interface 211. Selectable signal translator 210 may condition signals received from an ECU unit through the vehicle communication interface 230 to a conditioned signal compatible with diagnostic tool 100. Selectable signal translator 210 may communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, a solenoid drive, J1708, RS232, Controller Area Network (CAN), Keyword 2000 (ISO 14230-4), OBD II or other communication protocols that are implemented in a vehicle.

The circuitry to translate and send in a particular communication protocol can be selected by FPGA 214 (e.g., by tri-stating unused transceivers) or by providing a keying device that plugs into the connector interface 211 that may be provided by diagnostic tool 100 to communicatively connect diagnostic tool 100 to vehicle communication interface 230. Selectable signal translator 210 may be also coupled to FPGA 214 and the card reader 220 via the first system bus 224. FPGA 214 may transmit to and receive signals (i.e., messages) from the ECU unit through selectable signal translator 210.

The FPGA 214 may be coupled to the processor 202 through various address, data and control lines by the second system bus 222. The FPGA 214 also may be coupled to the card reader 220 through the first system bus 224. The processor 202 may be also coupled to the display 104 in order to output the desired information to the user. The processor 202 may communicate with the CPLD 204 through the second system bus 222. Additionally, the processor 202 may be programmed to receive input from the user through the user interface 106 via the CPLD 204. The CPLD 204 may provide logic for decoding various inputs from the user of diagnostic tool 100 and glue-logic for various other interfacing tasks.

Memory subsystem 208 and internal non-volatile memory (NVM) 218 may be coupled to the second system bus 222, which may allow for communication with the processor 202 and FPGA 214. Memory subsystem 208 can include an application dependent amount of dynamic random access memory (DRAM), a hard drive, and/or read only memory (ROM). Software to run the diagnostic tool 100 can be stored in the memory subsystem 208, including any database. The database may include protocol data for interfacing with various wireless charging standards (e.g., Qi standard).

For example, the database may include information about various charging protocols (e.g., initialization, termination, conversion) charging time and interfaces of various wireless charging standards. The database can also be stored on an external memory, such as a compact flash card or other memories.

Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 214, internal non-volatile memory 218 can contain downloadable images so that FPGA 214 can be reconfigured for a different group of communication protocols.

The charging interface 232 and charging converter 234 may be mounted in or on the housing 102 or any combination thereof. The charging interface 232 may be electronically coupled to the charging converter 234 and may allow the charging converter 234 to receive power and charge a power source of the diagnostic tool 100. The charging interface 232 may provide a unified interface with various types of chargers. For example, the charging interface 232 may provide a unified interface with an inductive charger, an optical charger, a microwave charger, and/or an electrical charger. The charging interface 232 may also provide a unified interface with various standards of wireless charging (e.g., Qi or other standards). The charging interface 232 may receive various power signals from different types of chargers. Various power signals may be in the form of an optical or electrical signal.

The charging converter 234 may convert the various received power signals into a standard format for charging a power source of the diagnostic tool 100. For example, the charging converter 234 may convert an optical signal into an electrical signal to charge a power source of the diagnostic tool 100, and vice versa. The charging converter 234 may include a voltage converter (e.g., a transformer) that may convert the received power signal to a higher voltage potential or a lower voltage potential. The charging converter 234 may be electronically coupled to the processor 202, which may be coupled to memory subsystem 208, non-volatile memory (N VM) 218 or a memory card in the card reader 220. The charging converter 234 may provide the power signal to the power source of the diagnostic tool 100.

The altimeter 236 may be used to determine the altitude of the diagnostic tool 100. The altimeter 236 may be electronically coupled to the processor 202 and can provide the altitude or elevation of the diagnostic tool 100. The altimeter 236 may be coupled to a barometric pressure sensor (not shown) in order to calibrate the elevation measurements determined by the altimeter 236. The barometric pressure sensor can be positioned interior or exterior to the housing of the diagnostic tool 100. Minor atmospheric pressure changes can affect the accuracy of the altimeter 236, thus, diagnostic tool 100 can correct for these changes by using the barometric pressure sensor in conjunction with the altimeter 236 along with a correction factor.

Wireless communication circuit 238 may communicate with the processor via second system bus 222. The wireless communication circuit 238 may be configured to communicate to RF (radio frequency), satellites, near field communication (NFC), cellular phones (analog or digital), Bluetooth®, Wi-Fi, Infrared, Zigby, Local Area Networks (LAN), WLAN (Wireless Local Area Network), or other wireless communication configurations and standards. The wireless communication circuit 238 may allow the diagnostic tool 100 to communicate with other devices wirelessly. The wireless communication circuit 238 may include an antenna and transceiver built therein and being housed within the housing 102 or can be externally located on the housing 102.

A diagnostic tool software may be installed to operate the diagnostic tool 100 (e.g., processor 202) to perform the various diagnostic tests. Also, the diagnostic tool program may be installed on a computer device of the user to operate the computer device to perform the various diagnostic tests. Different vehicle manufactures (or even within the same manufacture) may require the diagnostic tool 100 to operate using different programs and communication protocols. The diagnostic tool 100 may determine whether it is operating the correct software or program for a particular vehicle by comparing the vehicle type with the program currently running on the diagnostic tool 100. The vehicle type may be inputted into the diagnostic tool 100 through the user interface 106 in a manner such as, for example, scanning a bar coded VIN number located on the vehicle to be serviced, reading a radio frequency identification (RFID) device, or communicating with a wireless device of the vehicle. Also, the vehicle type may be manually inputted into the diagnostic tool 100 through the user interface in a manner such as, manually enter the VIN number. From the vehicle information, the diagnostic tool 100 can then determine whether it is presently running the necessary program to service the vehicle.

Figure 3:
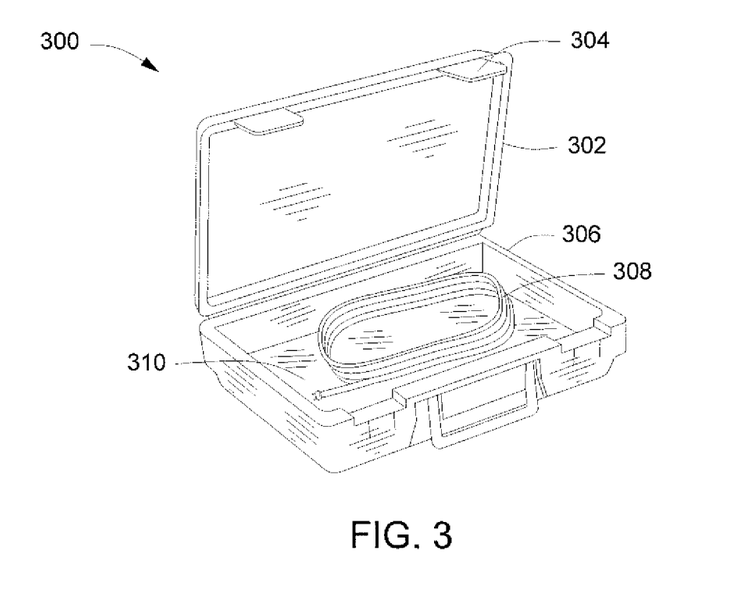
FIG. 3 depicts a carrying case having a wireless charger according to an exemplary embodiment of the present disclosure.

FIG. 3 illustrates a diagnostic tool carrying case 300 having a wireless charger according to an embodiment of the present disclosure. The diagnostic tool carrying case 300 may include a case housing 302 for carrying the diagnostic tool 100. The case housing 302 may include a locking device 304 for securely locking the diagnostic tool 100 within the case housing 302. The diagnostic tool carrying case 300 may include a power source 306, a power cord 308 and a wireless charger 310. The wireless charger 310 may be embedded into a large flat surface of the case housing 302 so that when the diagnostic tool 100 is placed inside the diagnostic tool carrying case 300, the diagnostic tool 100 may be automatically charged. In another example, the wireless charger 310 may be integrated on any surface of the case housing 302 so that when the diagnostic tool 100 is placed on any surface of the diagnostic tool carrying case 300, and the diagnostic tool 100 may be automatically charged.

The power cord 308 may be coupled to an external power source (e.g., an electrical outlet) to supply power to the wireless charger 310. In another exemplary embodiment, the power cord 308 may supply an electrical power to the power source 306. The power source 306 may be a portable power source that may enable continuous charging of the diagnostic tool 100 when the power cord 308 is not coupled to the external power source. The power source 306 may be integrated into the case housing 302 to store electrical energy. For example, the power source 306 may be configured to a shape similar to the case housing 302 and embedded into the case housing 302. In an exemplary embodiment, the power source 306 may be at least one of a wet cell battery, a dry cell battery, a molten salt battery and a reserve battery.

Figure 4:
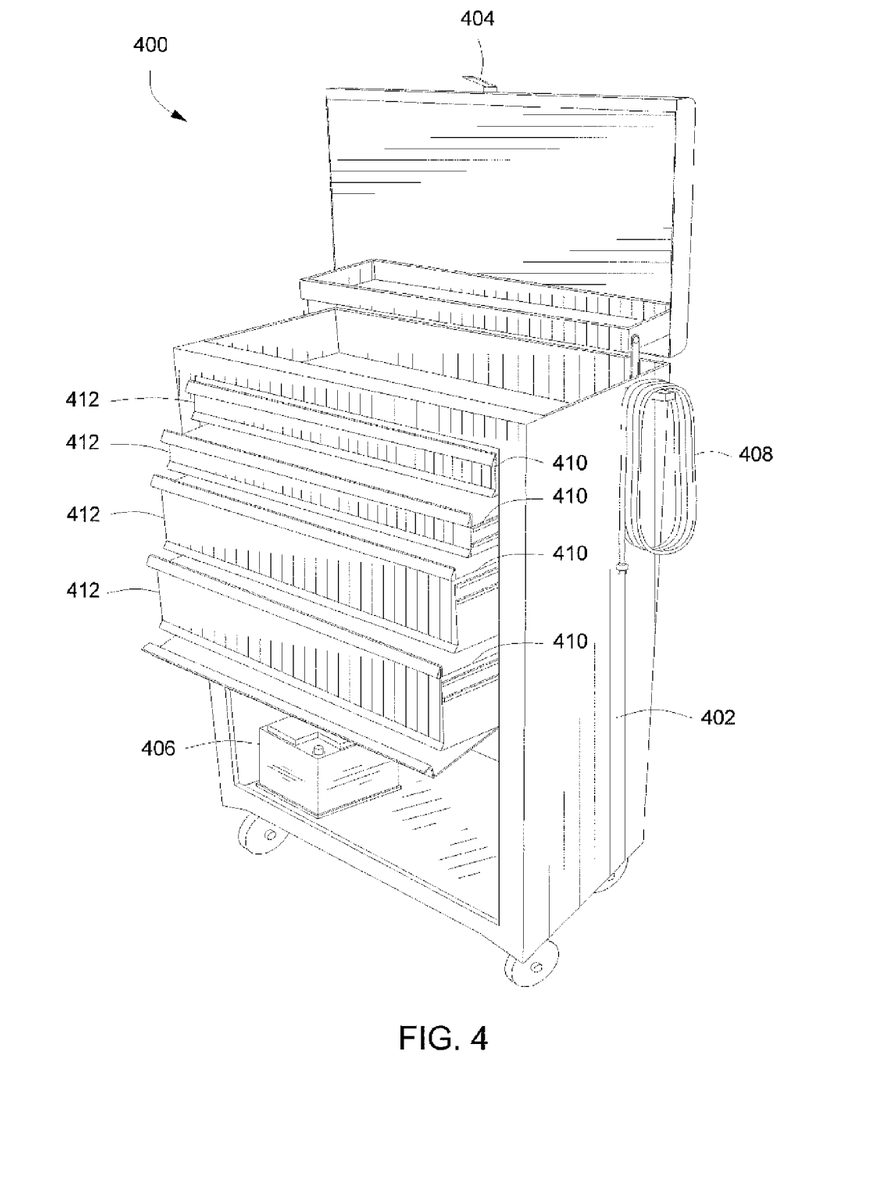
FIG. 4 depicts a diagnostic tool box having a plurality of wireless chargers according to an exemplary embodiment of the present disclosure.

FIG. 4 illustrates a diagnostic tool box 400 having a plurality of wireless chargers according to an embodiment of the present disclosure. The diagnostic tool box 400 may include a box housing 402 for storing the diagnostic tool 100. The box housing 402 may include a locking device 404 for securely locking the diagnostic tool 100 within the box housing 402. The diagnostic tool box 400 may include a plurality of compartments 412 for storing one or more diagnostic tools 100. The box housing 402 may include a power source 406, a power cord 408 and a plurality of wireless chargers 410. Each of the plurality of wireless chargers 410 may be embedded into a large flat surface of each of the plurality of compartments 412 so that when the diagnostic tool 100 is placed inside the plurality of compartments 412 of the diagnostic tool box 400, the diagnostic tool 100 may be automatically charged. In another example, each of the plurality of wireless chargers may be integrated on any surface of each of the plurality of compartments 412 so that when the diagnostic tool 100 is placed inside the plurality of compartments 412 of the diagnostic tool box 400, the diagnostic tool 100 may be automatically charged.

The power cord 408 may be coupled to an external power source (e.g., an electrical outlet) to supply power to the plurality of wireless chargers 410. In another exemplary embodiment, the power cord 408 may supply an electrical power to the power source 406. The power source 406 may be a portable power source (e.g., battery) and supply power to the plurality of wireless chargers 410. The power source 306 may be a portable power source that may enable continuous charging of the diagnostic tool 100 when the power cord 408 is not coupled to the external power source. The power source 406 may be placed within the box housing 402 to store electrical energy. For example, the power source 406 may be replaced with other power sources. In an exemplary embodiment, the power source 406 may be at least one of a wet cell battery, a dry cell battery, a molten salt battery and a reserve battery.

Figure 5:
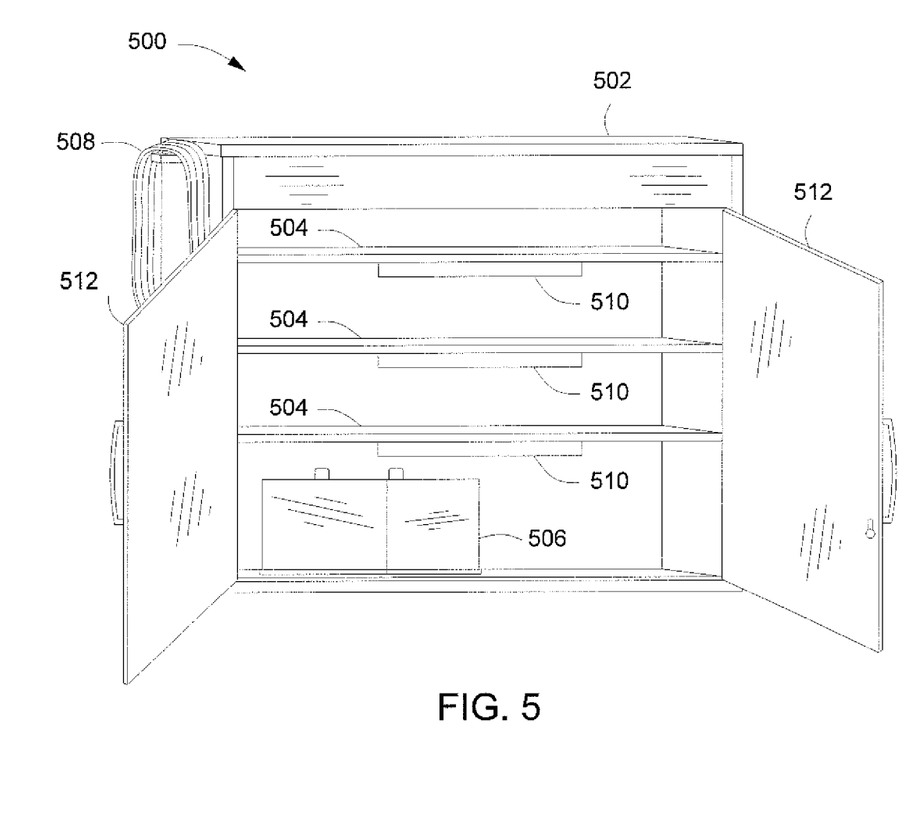
FIG. 5 depicts a diagnostic tool cabinet having a plurality of wireless charger according to an exemplary embodiment of the present disclosure.

FIG. 5 illustrates a diagnostic tool cabinet 500 having a plurality of wireless chargers according to an embodiment of the present disclosure. The diagnostic tool cabinet 500 may include a cabinet housing 502 for storing the diagnostic tool 100. The cabinet housing 502 may include a door 512 for securely locking the diagnostic tool 100 within the cabinet housing 502. The diagnostic tool cabinet 500 may include a plurality of cabinet shelves 504 for storing one or more diagnostic tools 100. The cabinet housing 502 may include a power source 506, a power cord 508 and a plurality of wireless chargers 510. Each of the plurality of wireless chargers 510 may be attached to each of the plurality of cabinet shelves 504 so that when the diagnostic tool 100 is placed inside the plurality of cabinet shelves 504 of the diagnostic tool cabinet 500, the diagnostic tool 100 may be automatically charged. In another example, each of the plurality of wireless chargers 510 may be integrated on any surface of the plurality of cabinet shelves 504 so that when the diagnostic tool 100 is placed inside the plurality of cabinet shelves 504 of the diagnostic tool cabinet 500, the diagnostic tool 100 may be automatically charged.

The power cord 508 may be coupled to an external power source (e.g., an electrical outlet) to supply power to the plurality of wireless chargers 510. In another exemplary embodiment, the power cord 508 may supply an electrical power to the power source 506. The power source 506 may be a portable power source (e.g., battery) and supply power to the plurality of wireless chargers 510. The power source 506 may be a portable power source that may enable continuous charging of the diagnostic tool 100 when the power cord 508 is not coupled to the external power source. The power source 506 may be placed within the cabinet housing 502 to store electrical energy. For example, the power source 506 may be replaced with other power sources. In an exemplary embodiment, the power source 506 may be at least one of a wet cell battery, a dry cell battery, a molten salt battery and a reserve battery.

Figure 6:
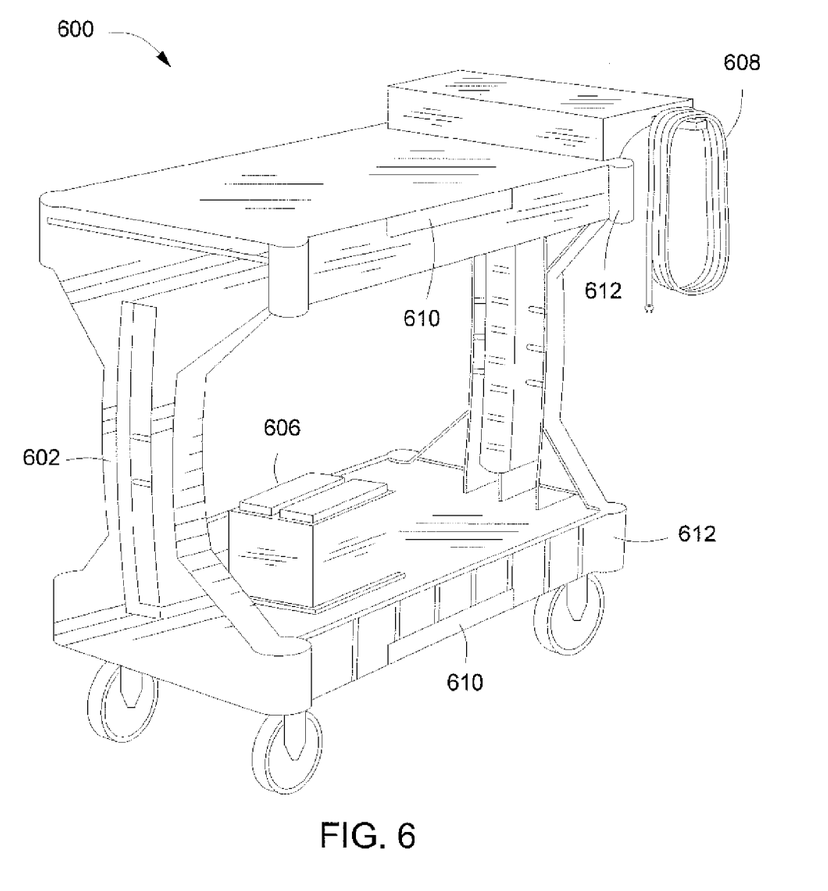
FIG. 6 depicts a diagnostic tool cart have a wireless charger according to an exemplary embodiment of the present disclosure.

FIG. 6 illustrates a diagnostic tool cart 600 having a wireless charger according to an embodiment of the present disclosure. The diagnostic tool cart 600 may be a plurality of cart levels 612 separated by a support 602. The plurality of cart levels 612 may store one or more diagnostic tools 100. It may be appreciated by one of skilled in the art that additional cart levels 612 may be included in the diagnostic tool cart 600 in order to accommodate additional diagnostic tools 100. The diagnostic tool cart 600 may include a power source 606, a power cord 608 and a plurality of wireless chargers 610. Each of the plurality of wireless chargers 610 may be integrated into each of the plurality of cart levels 612 so that when the diagnostic tool 100 is placed on the plurality of cart levels 612, the diagnostic tool 100 may be automatically charged.

The power cord 608 may be coupled to an external power source (e.g., an electrical outlet) to supply power to the plurality of wireless chargers 610. In another exemplary embodiment, the power cord 608 may supply an electrical power to the power source 606. The power source 606 may be a portable power source (e.g., battery) and supply power to the plurality of wireless chargers 610. The power source 606 may enable continuous charging of the diagnostic tool 100 when the power cord 608 is not coupled to the external power source. The power source 606 may be placed on the cart level 612 to store electrical energy. For example, the power source 606 may be replaced with other power sources. In an exemplary embodiment, the power source 606 may be at least one of a wet cell battery, a dry cell battery, a molten salt battery and a reserve battery.

Figure 7:
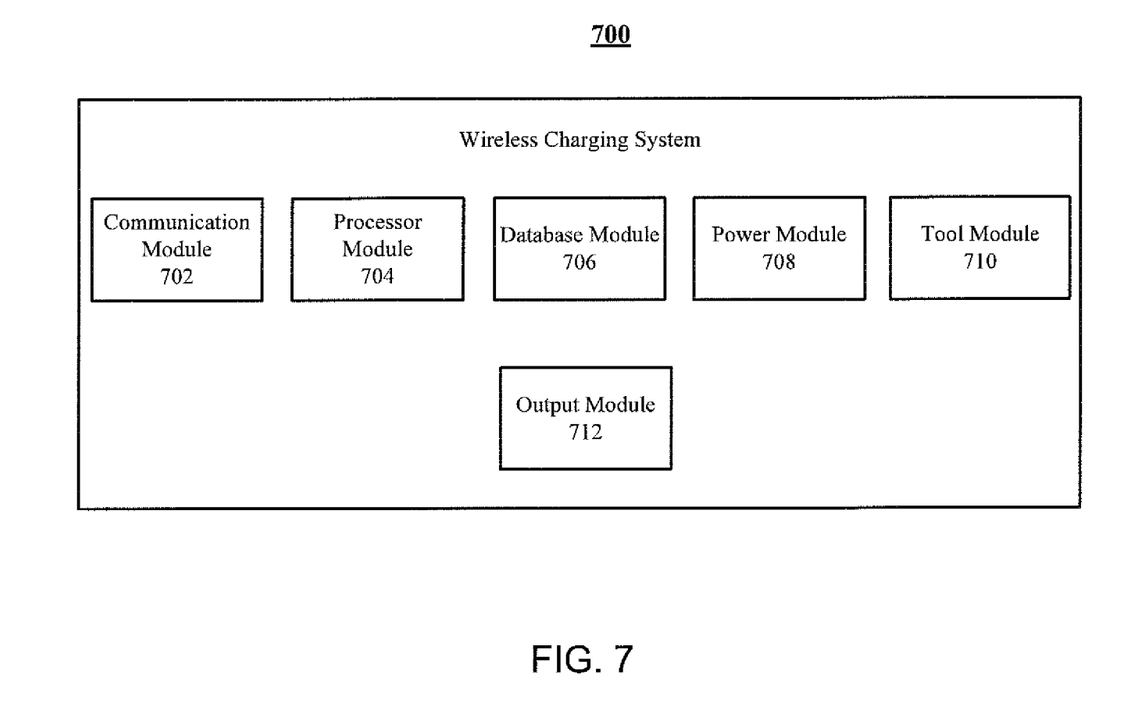
FIG. 7 illustrates hardware components of a wireless charging system according to an exemplary embodiment of the present disclosure.

FIG. 7 is a block diagram of hardware components of a wireless charging system 700 in accordance with an embodiment of the present disclosure. The wireless charging system 700 may include a communication module 702, a processor module 704, a database module 706, a power module 708, a tool module 710 and an output module 712. It is noted that modules 702-712 are exemplary and the functions performed by one or more of the modules may be combined or shared with that performed by other modules or may be separated and may be located or performed by other modules. The modules 702-712 may be stored by a single memory device or separate memory devices and operated or controlled by a plurality of computer processors or a single processor.

The communication module 702 may include transceivers and a computer processor to establish a communication with the diagnostic tool 100. The communication module 702 may also include a display and an input device to provide an interface for a user of the wireless charging system 700. The communication module 702 may include a user interface (e.g., a graphical user interface (GUI) or an application programming interface (API)) to transmit information between the wireless charging system 700 and the diagnostic tool 100 and a user. For example, the communication module 702 may include a separate or unified graphical user interface to communicate with the user of the wireless charging system 700. In another example, the communication module 702 may include an application programming interface (API) to communicate with the diagnostic tool 100. The communication module 702 may be communicatively coupled to other modules of the wireless charging system 700. For example, the communication module 702 may receive information from the diagnostic tool 100 and the user of the wireless charging system 700. In another example, the communication module 702 may communicate with a user, for example via a smartphone, to illustrate a charging of the diagnostic tool 100. The communication module 702 may provide the received information to the processor module 704 for processing or the database module 706 for storing.

The communication module 702 may include a transceiver to communicate with an external data source (not shown) via wireless or wired communication. For example, the communication module 702 may communicate with an external data source to receive information of various diagnostic tools 100. Also, the communication module 702 may receive updates of information of various diagnostic tools 100. The communication module 702 may communicate with the diagnostic tool 100 to receive information from the diagnostic tool 100. For example, the communication module 702 may receive diagnostic trouble codes (DTC) and other diagnostic information stored in the diagnostic tool 100. The communication module 702 may provide the information received from the diagnostic tool 100 to the external data source (not shown) and a remote computing device for further processing.

The power module 708 may include a transformer circuitry, a rectifier circuitry, a computer processor and other circuitries that may couple the wireless charging system 700 to a power source (e.g., portable power source or an external power source). For example, the power module 708 may receive an alternating current (AC) power from an external power source (e.g., AC outlet power source). The power module 708 may convert the AC power into a power that may be used to wirelessly charge the diagnostic tool 100. In another example, the power module 708 may receive a direct current (DC) power from a portable power source (e.g., battery). The power module 708 may convert the DC power into a power that may be used to wirelessly charge the diagnostic tool 100.

The tool module 710 may include a computer processor and a database to store information of various diagnostic tools 100. For example, the tool module 710 may store information of diagnostic tools 100 that may be charged by the wireless charging system 700. The tool module 710 may be customized by a user of the wireless charging system 700. For example, the tool module 710 may create a list of diagnostic tools 100 used by the user. The information of the diagnostic tool 100 may include, but not limited to, diagnostic tool type, serial number, manufacturer, date of production or shipment, previous charging records, electrical specifications, port connections, electrical configuration/layout, diagnostic specification, maintenance information, serial number, lot number, warranty information, a manufacture data code and the like.

The tool module 710 may identify the diagnostic tool 100 that is being charged by the wireless charging system 700. For example, the tool module 710 may receive information about the diagnostic tool 100 from the communication module 702. The tool module 710 may compare the information of the diagnostic tool 100 with the information of the diagnostic tool stored therein in order to identify the diagnostic tool 100. In an exemplary embodiment, the tool module 710 may identify the electrical specification of the diagnostic tool 100 and provide the electrical specification to other modules (e.g., communication module 702, processor module 704, database module 706, power module 708, and output module 712) of the wireless charging system 700.

The tool module 710 may store information received from the diagnostic tool 100. For example, the tool module 710 may store diagnostic information received from the diagnostic tool 100 via the communication module 702. The tool module 710 may interpret the diagnostic information received from the diagnostic tool 100. In an exemplary embodiment, the tool module 710 may provide an interpretation for diagnostic trouble codes (DTC) received from the diagnostic tool 100. In another example, the tool module 710 may receive updates of information of the diagnostic tool 100. For example, the tool module 710 may receive updated specification of the various diagnostic tools 100. In an exemplary embodiment, the tool module 710 may receive updated electrical specification information of various diagnostic tools 100.

The output module 712 may include a power circuitry and a computer processor to charge the diagnostic tool 100. For example, the output module 712 may receive information of the diagnostic tool 100 from the tool module 710 and output a power based at least in part on the information of the diagnostic tool 100. For example, the output module 712 may receive the electrical specification of the diagnostic tool 100 from the tool module 710 and output a power based at least in part on the electrical specification of the diagnostic tool 100.

The output module 712 may output various power levels to charge different diagnostic tool 100. For example, the output power level of the output module 712 may be manually selected by a user of the wireless charging system 700. In another example, the output power level of the output module 712 may automatically select an output power level based at least in part on the information of the diagnostic tool 100 (e.g., electrical specification).

The many features and advantages of the invention are apparent from the detailed specification, and thus, it is intended by the appended claims to cover all such features and advantages of the invention which fall within the true spirit and scope of the invention. Further, because numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An electrical charging system, comprising:
a storing vessel for storing a diagnostic tool; and
a wireless charging system integrated with the storing vessel for wirelessly charging the diagnostic tool when the diagnostic tool is placed within the storing vessel, the wireless charging system having a charging interface that provides a unified interface with the diagnostic tool;
the wireless charging system comprising:
a communication module having an application programming interface and configured to communicate with the diagnostic tool to receive vehicle diagnostic information including a diagnostic trouble code, the communication module further configured to communicate with a user's smartphone to illustrate a charging of the diagnostic tool;
a tool module configured to identify the diagnostic tool that is being charged and to store and interpret the diagnostic information received from the diagnostic tool; and
an output module that comprises a power circuitry for outputting a power signal to wirelessly charge the diagnostic tool based at least in part on information of the diagnostic tool;
wherein the information of the diagnostic tool includes an electrical specification of the diagnostic tool.

2. The electrical charging system of claim 1, wherein the storing vessel is a carrying case.

3. The electrical charging system of claim 1, wherein the storing vessel is a tool box.

4. The electrical charging system of claim 3, wherein the tool box comprises a plurality of compartments for storing the diagnostic tool.

5. The electrical charging system of claim 4, wherein the wireless charging system is integrated with each of the plurality of compartments.

6. The electrical charging system of claim 1, wherein the storing vessel is a tool cabinet.

7. The electrical charging system of claim 1, wherein the storing vessel is a tool cart.

8. The electrical charging system of claim 1, wherein the storing vessel comprises a portable power source to allow a continuous charging of the diagnostic tool.

9. The electrical charging system of claim 8, wherein the portable power source is integrated with the storing vessel.

10. The electrical charging system of claim 1, wherein the storing vessel comprises a power cord for connecting the wireless charging system to an external power source.

11. The electrical charging system of claim 1, wherein the charging interface provides the unified interface with at least one of the following: an inductive type charging system, an optical type charging system, a microwave type charging system, and an electrical type charging system.

12. The electrical charging system of claim 1, wherein diagnostic tool further comprises a charging converter for converting received power signals into a standard format for charging the diagnostic tool.

13. The electrical charging system of claim 12, wherein the charging converter converts the received power signals to a higher voltage potential or a lower voltage potential.

14. A wireless charging system comprising:
- a communication module that comprises a transceiver for communicating with a diagnostic tool and receiving information from the diagnostic tool and a user;
- a power module that comprises a computer processor for receiving power signals from a power source; and
- an output module that comprises a power circuitry for outputting a power signal to wirelessly charge the diagnostic tool based at least in part on information of the diagnostic tool; and
- a charging interface that provides a unified interface for the diagnostic tool,
- wherein the information of the diagnostic tool includes an electrical specification of the diagnostic tool and vehicle diagnostic information including a diagnostic trouble code, and the communication module further configured to communicate with a user's smartphone to illustrate a charging of the diagnostic tool.

15. The wireless charging system of claim 14, wherein the communication module comprises a display and an input device to provide an interface for the user.

16. The wireless charging system of claim 14, further comprising a tool module for storing information of the diagnostic tool.

17. The wireless charging system of claim 16, wherein the information of the diagnostic tool further includes at least one of the following: diagnostic tool type, serial number, manufacturer, date of production or shipment, previous charging records, port connections, electrical configuration/layout, diagnostic specification, maintenance information, serial number, lot number, warranty information and a manufacture data code.

18. A wireless charging system comprising:
- a communication module that comprises a transceiver for receiving information from a diagnostic tool, wherein the information from the diagnostic tool comprises information of the diagnostic tool and diagnostic information stored by the diagnostic tool including a diagnostic trouble code, the communication module further configured to communicate with a user's smartphone to illustrate a charging of diagnostic tool;
- a power module that comprises a computer processor for receiving power signals from a power source;
- a tool module configured to identify the diagnostic tool that is being charged and to store and interpret the diagnostic information from the diagnostic tool; and
- an output module that comprises a power circuitry for outputting a power signal to wirelessly charge the diagnostic tool based at least in part on the information of the diagnostic tool;
- wherein the information of the diagnostic tool includes an electrical specification of the diagnostic tool.

* * * * *